O. H. LARSON.
VENTILATING FAUCET.

No. 187,286. Patented Feb. 13, 1877.

WITNESSES:
H. Rydquist
J. H. Scarborough

INVENTOR:
O. H. Larson
BY
ATTORNEYS.

UNITED STATES PATENT OFFICE.

OLE H. LARSON, OF FORT DODGE, IOWA.

IMPROVEMENT IN VENTILATING-FAUCETS.

Specification forming part of Letters Patent No. 187,286, dated February 13, 1877; application filed December 18, 1876.

*To all whom it may concern:*

Figure 1:
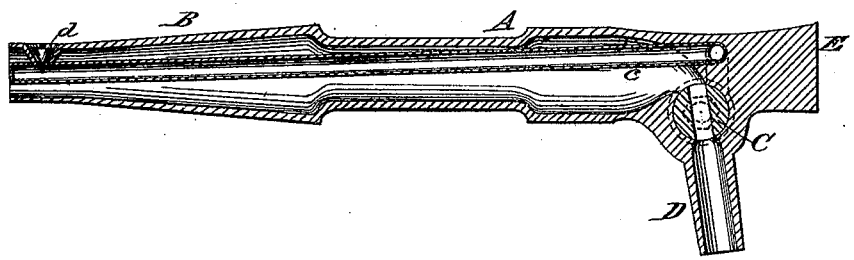
Figure 2:
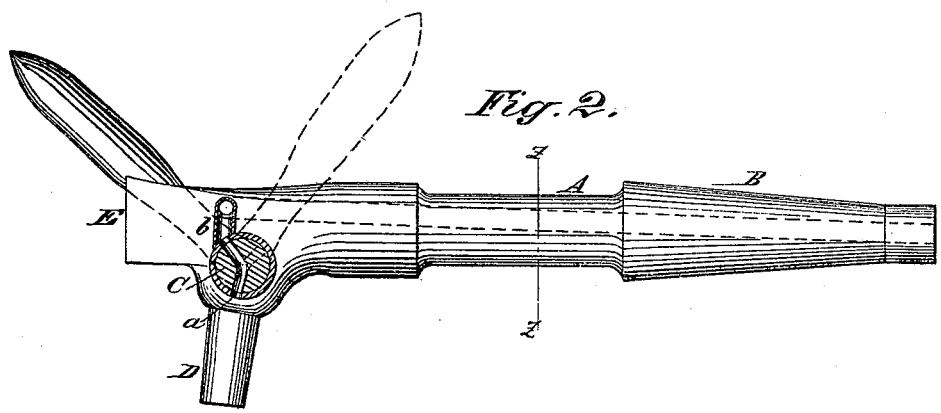
Figure 3:
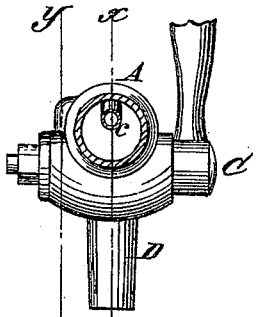

Be it known that I, OLE H. LARSON, of Fort Dodge, in the county of Webster and State of Iowa, have invented a new and Improved Ventilating-Faucet, of which the following is a specification:

Figure 1 is a central longitudinal section on line $x\,x$ in Fig. 3. Fig. 2 is a side elevation, in part section, on line $y\,y$, Fig. 3. Fig. 3 is a transverse section on line $z\,z$ in Fig. 2.

Similar letters of reference indicate corresponding parts.

My invention consists in a faucet in which the plug, and cylinder which contains it, are provided with an aperture for admitting air to a tube that runs lengthwise through the faucet to its inner end, where it is provided with a check-valve which admits air to the cask when the faucet is opened, but prevents the exit of beer through the air-pipe. The invention also consists in placing the plug of the faucet below its main body, so that, in driving the faucet into a cask, it will not become battered, so as to leak.

In the drawing, A is the body of the faucet, which is tapered in the usual way at B, to fit the hole in the cask.

C is the faucet-plug, which is placed below the center-line of the faucet to prevent it from becoming battered out of shape by driving the faucet into the cask. D is the nozzle, through which the beer escapes from the faucet. E is the head of the faucet, which is made solid to receive the blows of the mallet used in driving it into the cask.

A passage, $a$, is made through the casing of the plug C, and through the plug, that communicates, by means of a passage, $b$, with the pipe $c$, which runs through the inside of the faucet to its inner end, where it is provided with the check-valve $d$, that opens upward. When the plug C is turned to allow the beer to escape from the cask, the passage $a$ in the plug-casing and in the plug coincide, and air is admitted through the tube $c$ to the interior of the cask, the nozzle D being of sufficient length to create the suction required to raise the valve $d$. If the beer should tend to escape through the tube $c$ the valve $d$ immediately closes. The head E of the faucet is made sufficiently solid to resist the battering of the mallet used in driving the faucet into the cask.

Having thus described my invention, I claim as new and desire to secure by Letters Patent—

The combination, in a ventilating-faucet, having the check-valve $d$, of the plug C, with passage $a$ and the air-tube $c$ communicating with said plug by a passage, $b$, all arranged as shown and described.

OLE H. LARSON.

Witnesses:
P. W. CHAUTLAND,
H. HENNIGES.